United States Patent Office  3,446,750
Patented May 27, 1969

3,446,750
COMPOSITION CONTAINING RUBBER CHEMICALS
Alun Angus Jones and Eric Rogers, Wrexham, Wales, assignors to Monsanto Chemicals Limited, London, England, a British company
No Drawing. Continuation of application Ser. No. 475,595, July 28, 1965. This application Jan. 15, 1968, Ser. No. 698,048
Int. Cl. C09k 3/00
U.S. Cl. 252—402                                15 Claims

ABSTRACT OF THE DISCLOSURE

The invention is a composition containing certain zinc salts which are rubber chemicals useful as rubber stabilizers or vulcanization accelerators. The composition of this invention can be readily and uniformly dispersed in aqueous rubber systems. The composition contains a zinc salt of a dithiocarbamic acid or a mercaptobenzothiazole and a wetting agent and includes a finely divided, water-insoluble, absorbent solid which functions to prevent caking. The composition can, with advantage, also contain a thickening agent.

---

This invention relates to compositions containing rubber chemicals, in particular to compositions containing certain zinc salts that are useful as rubber stabilizers or accelerators.

Such zinc salts, for example the zinc N,N-dialklydithiocarbamates and zinc mercaptobenzothioale, are water-insoluble materials and are used in the rubber industry in the form of fine powders. There are occasions when it is required to add one of these zinc salts to an aqueous system, for example a rubber latex or an aqueous suspension of the rubber particles, but it is extremely difficult to obtain a uniform dispersion of the normal form of powder.

We have now discovered how these zinc salts can be formulated to give powders that are readily and uniformly dispersed in aqueous systems.

The present invention comprises a composition containing a zinc salt of a dithiocarbamic acid or of a mercaptobenzothiazole and a wetting agent that is an alkali metal or ammonium salt of an alkylaromatic sulfonic acid, an alkali metal or ammonium salt of an alkly sulfate containing 6 or more carbon atoms, or an alkali metal or ammonium salt of a sulfated fatty acid ester. The invention includes a finely-divided, water-insoluble, absorbent solid, which functions to prevent caking. Finely-divided calcium and magnesium silicates have been found to be particularly suitable for this purpose. A composition of the invention can, with advantage, also contain a thickening agent, that is to say a material whose aqueous solutions or dispersions even at low concentrations have relatively high viscosities. Such materials include polyelectrolytes, for instance sodium carboxymethyl cellulose.

The alkali metal salts, in particular the sodium salts, are those most usually employed.

Where the composition contains an alkali metal salt of an alkylaromaticsulfonic acid, this is preferably an alkali metal salt of an alkylnaphthalenesulfonic acid.

The zinc salts of dithiocarbamic acids that can be formulated according to the present invention include the zinc N,N-dialkyldithiocarbamates, for example N,N-dimethyldithiocarbamate, zinc N,N-diethyldithiocarbamate, and zinc N,N-di-n-butyldithiocarbamate. Also included are the zinc salts of N-substituted dithiocarbamic salts in which the nitrogen atom forms part of a ring, for example zinc morpholinocarbodithioate and zinc piperidinocarbodithioate, zinc salts of N-alkyl, N-aryldithiocarbamic acids, for example zinc N-ethyl-N-phenyldithiocarbamate, and zinc salts of dithiocarbamic acids containing more than one dithiocarbamate group, for example zinc ethylenebis(dithiocarbamate).

Where the formulation contains a zinc salt of a mercaptobenzothiazole, this is usually 2-mercaptobenzothiazole, although it can be for example a nuclear substituted 2-mercaptobenothiazole.

Alkali metal salts of the alkylaromaticsulfonic acids, the alkly sulfates and the sulfated fatty acid esters that can be used in compositions of the present invention include the sodium and potassium salts. The sodium salts are generally the most readily available of the alkali metal salts.

Salts of alkylaromaticsulfonic acids that can be used include those of alkylbenzensulfonic acids in which the alkly group contains for example from 8 to 16 carbon atoms, for example sodium dodecylbenzene sulfonate. The preferred materials of this type are, however, the salts, in particular the alkali metal salts, of alklynaphthalenesulfonic acids in which the alkyl group contains from 2 to 6 carbon atoms, for example sodium propylnaphthalenesulfonate or sodium butylnaphthalenesulfonate. The material that is commercially available under the name Perminal BX has been found to be especially suitable. Perminal BX is reported to be sodium alkylnaphthalenesulfonate.

Where the alkali metal or ammonium salt is one of an alkyl sulfate containing 6 or more carbon atoms, the alkyl sulfate is preferably a secondary alkyl sulfate having the formula:

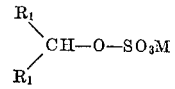

where M represents an alkali metal, $R_1$ represents a relatively long alkyl chain containing for instance 4 or more carbon atoms, for example one containing from 10 to 20 carbon atoms, and $R_2$ represents a lower alkyl group containing up to 3 carbon atoms, for example an ethyl or propyl group. Good results have been obtained using a solid form of a wetting agent believed to be a sulfated olefin which is sold under the name Teepol.

Alkali metal or ammonium salts of sulfated fatty esters that can be used are generally those derived from unsaturated fatty acids containing from 12 to 24 carbon atoms, for example 9-hexadecenoic acid, oleic acid, 11-octadecenoic acid, 9-eicosenoic acid, 11-docosenoic acid, or erucic acid. The esterifying radical is usually one containing from 1 to 8 carbon atoms, especially an alkyl radical containing from 2 to 6 carbon atoms, for instance a propyl, butyl, or hexyl radical. The sodium salts of sulfated esters of oleic acid are particularly suitable.

The commercially available alkali metal and ammonium salts of alkylaromatic sulfonic acids, higher alkyl sulfates and sulfated fatty acid esters are often sold as mixtures with carriers or extenders, for example sodium sulfate.

Such commercial materials are quite suitable for use in compositions of the invention.

The amount of wetting agent in a composition of the invention can be for example from 0.25 to 5.0% and is preferably from 0.25 to 2.0%, for instance from 0.3 to 0.6% of the weight of the zinc salt. Where the commercially available wetting agent contains the active material in admixture with other ingredients, the amount used is selected to give an appropriate content of active material in the composition.

A composition of the invention can of course contain a mixture of different wetting agents of the specified kinds, for instance alkali metal salts of both an alkylaromaticsulfonic acid and a higher alkyl sulfate. Salts of other sulfonated materials can also be present, for example sodium lignin sulfonate.

Finely-divided, absorbent, water-insoluble solids that can be used in compositions of the invention include, in addition to the calcium and magnesium silicates referred to above, such materials as kieselguhr and silica, for example the silica sold as Manosil VN 3. Where a finely-divided, absorbent, water-insoluble solid is present in the composition the amount can, for example, be from 0.25 to 3%, and preferably from 0.5 to 2.5%, of the weight of the zinc salt.

Where the composition includes a thickening agent, this can be for example a water soluble polyelectrolyte such as for instance an alkali metal salt of a carboxyalkyl cellulose, or an alkali metal salt of a polyacrylic acid or partially hydrolyzed polyacrylate ester or polyacrylonitrile. Other suitable water soluble materials include polyvinyl alcohol, methyl cellulose, gelatin and polyvinylpyrrolidone. Water insoluble materials having a similar effect include certain clays such as for instance Bentonite clay.

The quantity of a thickening agent in a composition can be for example from 0.25 to 2.5% of the weight of the zinc salt. Using sodium carboxymethyl cellulose, from 0.3 to 1.3%, for example 0.5% or 1.0% of the weight of the zinc salt has been found particularly suitable.

A composition of the invention is conveniently produced simply by blending the dry components in a suitable mixer. If desired, the mixture can be subjected to a milling or sieving operation after blending.

The invention is illustrated by the following examples.

Example I

Blends having the compositions shown in the following table were prepared by mixing the dry components.

| Components | Amount (parts by weight) (blend No.) | | | | | |
|---|---|---|---|---|---|---|
| | 1 | 2 | 3 | 4 | 5 | 6 |
| Zinc, N,N-di-n-butyl dithiocarbamate | 100 | 100 | 100 | 100 | 100 | 100 |
| Sodium alkylnaphthalenesulfonate (Perminal BX) | 0.5 | 0.5 | | 0.25 | | 0.5 |
| Sodium alkyl sulfate (Teepol A, 40% by weight of active material) | | | 1.0 | 1.0 | 1.0 | |
| Sodium lignin sulfonate | | | 2.0 | 2.0 | | |
| Sodium carboxymethyl cellulose | | | | 1.0 | 0.5 | 1.0 |
| Calcium silicate (Microcal 160) | 1.0 | 1.0 | 1.0 | 1.0 | 0.5 | 2.0 |

Each blend was found to disperse easily and uniformly when added to stirred water.

Example 2

The following table shows the compositions of further blends prepared by mixing the dry components.

| Components | Parts by weight | | | |
|---|---|---|---|---|
| Zinc N,N-di-n-butyl-dithiocarbamate | 100 | | | |
| Zinc N,N-diethyl-dithiocarbamate | | 100 | | |
| Zinc N,N-dimethyl-dithiocarbamate | | | 100 | |
| Zinc 2-mercapto-benzothiazole | | | | 100 |
| Sodium salt of sulfated butyl oleate | 1 | 1 | 1 | 1 |
| Sodium secondary alkyl (C₈–C₁₀) sulfate | | | | 1 |
| Bentonite clay | 2 | 2 | | 2 |
| Calcium silicate (Microcal 160) | | | 2 | |
| Partially hydrated magnesium silicate (Seprolite (−100)) | | 2 | 2 | |

Each blend dispersed easily and uniformly when added to stirred water.

It is intended to cover all changes and modifications of the examples of the invention herein chosen for purposes of disclosure which do not constitute departures from the spirit and scope of the invention.

We claim:
1. A composition consisting essentially of a member selected from the group consisting of zinc N,N-di(lower alkyl)dithiocarbamate, zinc morpholinocarbodithioate, zinc piperidinocarbodithioate, zinc N-lower alkyl-N-aryl-dithiocarbamate, zinc ethylenebis(dithiocarbamate), and zinc 2-mercaptobenzothiazole; a wetting agent selected from the group consisting of alkali metal salt of alkyl aryl sulfonic acid containing 8 to 16 carbon atoms, ammonium salt of alkyl aryl sulfonic acid containining 8 to 16 carbon atoms, alkali metal salt of alkyl sulfate containing 6 to 24 carbon atoms, ammonium salt of alkyl sulfate containing 6 to 24 carbon atoms, alkali metal lower alkyl fatty acid ester sulfate, ammonium lower alkyl fatty acid ester sulfate, and mixtures thereof; and an anticaking agent selected from the group consisting of calcium silicate, magnesium silicate, silica, and kieselguhr in an amount effective to prevent caking.

2. A composition according to claim 1 in which the anticaking agent is calcium silicate.

3. A composition according to claim 1 which contains as an additional ingredient a thickening agent selected from the group consisting of alkali metal carboxymethyl cellulose, alkali metal polyacrylic acid, partially hydrolyzed polyacrylic acid, polyacrylonitrile, polyvinyl alcohol, methyl cellulose, gelatin, polyvinylpyrrolidone, and bentonite.

4. A composition according to claim 3 in which the thickening agent is sodium carboxymethyl cellulose.

5. A composition according to claim 1 wherein the wetting agent is a salt selected from the group consisting of alkali metal lower alkyl fatty acid ester sulfate derived from unsaturated fatty acid containing from 12 to 24 carbon atoms and ammonium lower alkyl fatty acid ester sulfate derived from unsaturated fatty acid containing from 12 to 24 carbon atoms.

6. A composition according to claim 5 in which the anticaking agent is calcium silicate or magnesium silicate.

7. A compostion according to claim 5 in which the zinc salt is zinc N,N-di(lower alkyl)dithiocarbamate.

8. A composition according to claim 7 which contains as an additional ingredient a thickening agent selected from the group consisting of alkali metal carboxymethyl cellulose, alkali metal polyacrylic acid, partially hydrolyzed polyacrylic acid, polyacrylonitrile, polyvinyl alcohol, methyl cellulose, gelatin, polyvinylpyrrolidone, and bentonite.

9. A composition according to claim 7 wherein the zinc salt is a member selected from the group consisting of zinc N,N-dimethyldithiocarbamate, zinc N,N-diethyldithiocarbamate, and zinc N,N-di-n-butyldithiocarbamate.

10. A composition according to claim 9 which contains as an additional ingredient a thickening agent selected from the group consisting of alkali metal carboxymethyl cellulose, alkali metal polyacrylic acid, partially hydrolyzed polyacrylic acid, polyacrylonitrile, polyvinyl alcohol, methyl cellulose, gelatin, polyvinypyrroidone, and bentonite.

11. A composition according to claim 1 wherein the wetting agent is sodium butyl oleate sulfate.

12. A composition according to claim 5 which contains as an additional ingredient a thickening agent selected from the group consisting of alkali metal carboxymethyl cellulose, alkali metal polyacrylic acid, partially hydrolyzed polyacrylic acid, polyacrylonitrile, polyvinyl alcohol, methyl cellulose, gelatin, polyvinylpyrrolidone, and bentonite.

13. A composition according to claim 12 in which the thickening agent is bentonite clay.

14. A composition according to claim 3 in which the wetting agent is sodium butyl oleate sulfate.

15. A composition according to claim 3 in which the wetting agent is a mixture of alkali metal salt of alkyl aryl sulfonic acid and alkali metal lower alkyl fatty acid ester sulfate.

References Cited

UNITED STATES PATENTS 3,105,055   9/1963   Aho _____ 260—29.7 X

LEON D. ROSDOL, *Primary Examiner.*

STANLEY D. SCHWARTZ, *Assistant Examiner.*

U.S. Cl. X.R.

260—29.7, 819